US006467166B1

(12) United States Patent
Saiki et al.

(10) Patent No.: US 6,467,166 B1
(45) Date of Patent: Oct. 22, 2002

(54) METHOD OF FORMING A CAMSHAFT FOR AN ENGINE

(75) Inventors: Yuji Saiki; Naoki Tsuchida; Mitsuo Tsuchiya, all of Iwata (JP)

(73) Assignee: Yamaha Hatsudoki Kanushiki Kaisha, Iwata (JP)

( * ) Notice: Subject to any disclaimer, the term of this patent is extended or adjusted under 35 U.S.C. 154(b) by 0 days.

(21) Appl. No.: 09/656,922

(22) Filed: Sep. 7, 2000

Related U.S. Application Data

(62) Division of application No. 09/406,187, filed on Sep. 27, 1999, now Pat. No. 6,170,449.

(30) Foreign Application Priority Data

Sep. 30, 1998 (JP) .......................................... 10-278149

(51) Int. Cl.[7] ................................................ B23P 15/00
(52) U.S. Cl. ........................................ 29/888.1; 29/558
(58) Field of Search ................................ 29/888.1, 557, 29/558; 74/567, 569; 451/62, 276, 460

(56) References Cited

U.S. PATENT DOCUMENTS 4,122,634 A * 10/1978 Nishimura et al.
4,346,535 A * 8/1982 Asano et al.
5,644,949 A * 7/1997 Murakani et al. ........... 451/276
5,722,878 A * 3/1998 Phillips ........................ 451/49
5,975,995 A * 11/1999 Hykes et al. ................. 451/62
6,080,051 A * 6/2000 Weber ......................... 451/49

* cited by examiner

*Primary Examiner*—I Cuda Rosenbaum
(74) *Attorney, Agent, or Firm*—Ernest A. Beutler

(57) ABSTRACT

A multi-valve internal combustion engine having a plurality of valves having skewed axes that are operated by cam lobes of a single cam shaft. The cam shaft operates the valves through rocker arms each of which are pivoted independently about axes that are skewed relative to the cam shaft axis so as to minimize bending stresses on the valve during its actuation. This also avoids scuffing between the rocker and the valve stem. At the same time, good contact is maintained between the cam lobe and the follower surface by machining the cam lobe so that it will have a slight concavity at least in its tip portion so as to ensure constant line contact with the follower.

5 Claims, 12 Drawing Sheets

METHOD OF FORMING A CAMSHAFT FOR AN ENGINE

CROSS REFERENCE TO RELATED APPLICATION

This application is a division of our application entitled, "Valve Operating System For Engine", Ser. No. 09/406187, filed Sep. 27, 1999 U.S. Pat. No. 6,170,449 and assigned to the assignee hereof.

BACKGROUND OF THE INVENTION

This invention relates to a valve operating system for an engine and more particularly to an improved method for forming the camshaft surfaces thereon for operating a plurality of valves from a single camshaft where the valves reciprocate about axes that are skewed to each other.

In order to provide an optimum combustion chamber configuration and large flow areas, it has been proposed to provide a cylinder head wherein at least two valves are operated by the same camshaft for a given cylinder and these valves reciprocate about axes that are not parallel to each other but rather are in a skewed relationship. By employing such an arrangement, it is possible to form a combustion chamber shape that is more like a segment of a sphere.

However, this gives rise to considerable difficulties in the actuation of the valve. That is with conventional camshaft operated valves, the valve reciprocates about an axis that lies in a plane that is perpendicular to the axis of the camshaft. The valve reciprocal axis may also intersect the camshaft axis, but this is not essential. If the valve reciprocal axis does not lie in a plane that is perpendicular to the camshaft axis, it is difficult if not impossible to operate it without scuffing between the valve and its actuating element.

A system has been proposed wherein each valve is operated by a pair of rocker arms. The first rocker arm is operated by a respective cam lobe on the camshaft. This first rocker arm operates the valve through the second rocker arm. The rocker arms are supported so that their pivotal axes are at an angular relationship to each other so as to minimize sliding or scuffing contact between the rocker arm that operates the valve and the tip of the valve stem.

Obviously, the use of such multiple rocker arms substantially complicates the engine construction and minimizes the available space for other components in the cylinder head arrangement.

Therefore, there has been proposed a system wherein the valve is operated by a single rocker arm that contacts a three-dimensional cam surface formed on the camshaft. With this type of arrangement, only one rocker arm need be employed for each valve. However, it is important that the contact between the cam surface and the rocker arm be maintained at a line contact rather than a point contact. If this is not done, there will be a substantial problem because the oil film will break down at the point of contact between the cam and its follower surface.

It is, therefore, a principal object of this invention to provide an improved cam and follower arrangement for operating a poppet valve through a three-dimensional cam surface of the camshaft.

It is a further object to configure the cam surface in such a way that it has a curvature that will be mated with a curved surface of the follower of the rocker arm so as to maintain a line contact during the opening and closing of the associated valve.

It is a further object of this invention to provide an improved method for forming a cam lobe that will achieve the results desired.

SUMMARY OF THE INVENTION

This invention is adapted to be embodied in a method for forming a camshaft for a valve actuating system for an internal combustion engine wherein the camshaft has a cam lobe formed thereon that has a three-dimensional configuration. A rocker arm has a follower surface that is engaged with this cam lobe for pivoting the rocker arm about a pivotal axis that is disposed at a skewed angle to the axis of rotation of the camshaft. The rocker arm has an actuating surface that is engaged with a poppet-type valve that reciprocates about an axis that is skewed relative to the camshaft axis and which lies in a plane that is generally perpendicular to the rocker arm pivot axis. The cam lobe is configured so as to have a slight concavity on its follower engaging surface so as to maintain a line contact with the curved follower surface of the rocker arm.

The invention is embodied in a method for forming a cam lobe having a configuration as described in the preceding paragraph. This method involves the mounting of a camshaft blank having a blank cam lobe for rotation about an axis that is coincident to the rotational axis of the camshaft in the engine. A grinding wheel having a curved grinding surface is mounted for rotation about an axis that is skewed to the axis of rotation about which the mounted camshaft rotates. This axis is also supported for translational movement relative to the camshaft axis for forming the desired camshaft lobe configuration. The camshaft is rotated slowly about the camshaft axis while the grinding wheel is rotated about its axis. This axis is translated relative to the camshaft axis so as to form the desired cam lobe configuration. The movement of the grinding wheel axis is done in a manner so that the grinding wheel will contact the cam lobe surface along a line that conforms to the line of contact of the cam lobe with the follower when mounted in the engine.

DETAILED DESCRIPTION OF THE PREFERRED EMBODIMENTS OF THE INVENTION

Figure 1:
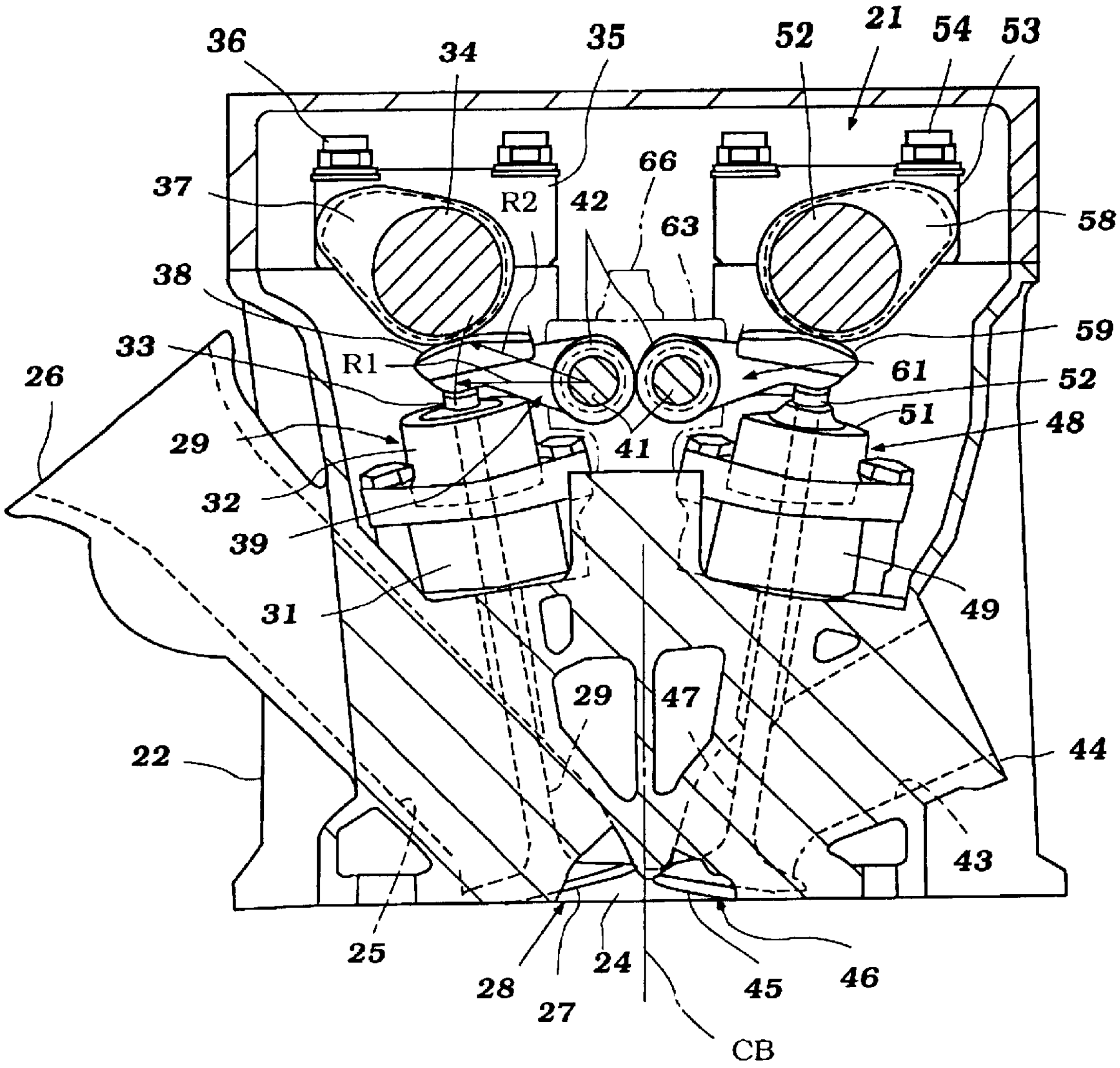
FIG. 1 is a cross-sectional view taken through a cylinder head of an internal combustion engine constructed in accordance with an embodiment of the invention and is taken generally along the line 1—1 of FIG. 2.
Figure 2:
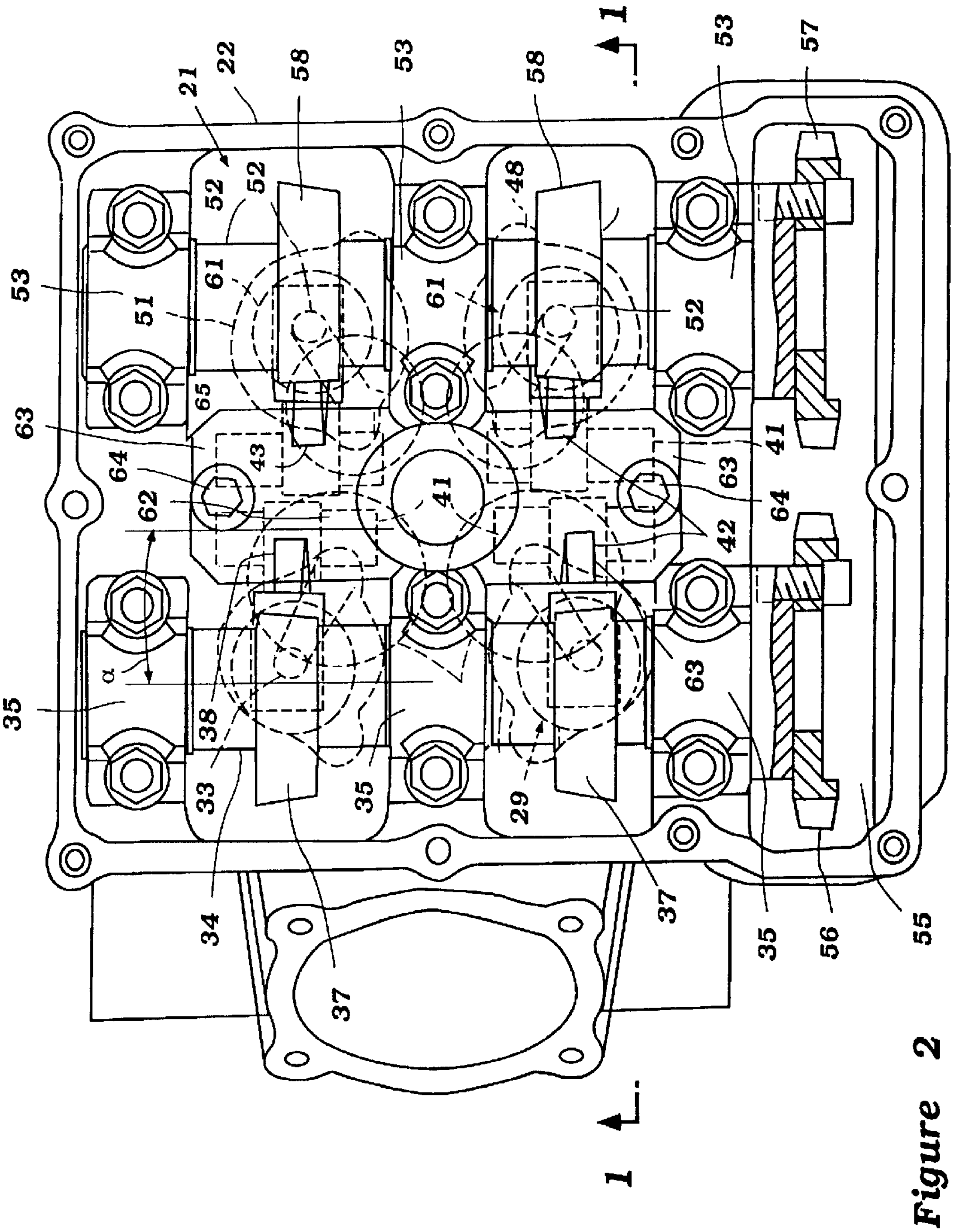
FIG. 2 is a top, plan view of the cylinder head shown in FIG. 1 but with the cam cover removed so as to more clearly show the valve operating construction and specifically the camshafts, rocker arms, and rocker arm supports.

Referring now in detail to the drawings and initially to FIGS. 1 and 2, a cylinder head assembly, indicated generally by the reference numeral 21, forms a portion of an internal combustion engine with which the invention is utilized. The cylinder head assembly 21 is depicted apart from the remaining components of the engine since the invention deals primarily with the valve and valve actuating mechanism associated with the cylinder head assembly 21.

In the illustrated embodiment, only a single cylinder is depicted, but it will be readily apparent to those skilled in the art how the invention can be utilized in conjunction with engines having multiple cylinders and a wide variety of cylinder configurations such as V-type, opposed, etc.

The cylinder head assembly 21 includes a main cylinder head member 22 which is formed primarily as a casting from a light alloy such as aluminum or alloys thereof. The cylinder head member 22 has a lower surface 23 that is adapted to be brought into sealing engagement with the upper end of the associated cylinder block. This closes a cylinder bore, having a cylinder bore axis indicated by the phantom lines CB. The cylinder head member 22 is affixed to the cylinder block in any suitable known manner.

The cylinder head surface 23 is formed with a recess 24 in its lower surface which cooperates with the cylinder bore and the head of a piston that reciprocates in the cylinder bore to form the combustion chamber of the engine. Preferably, the configuration of the recess 24 is that of a segment of a sphere. This is made possible by means of the valve configuration, which will be described next.

The cylinder head assembly 21 forms an intake side and this is the left side appearing in FIGS. 1 and 2. A Siamese-type intake passage 25 extends from an inlet opening in an outer surface 26 at this side of the cylinder block and terminates in a pair of valve seats which comprise intake valve seats. A suitable induction system is affixed relative to the cylinder head surface 26 for supplying at least an air charge to the intake passage 25.

The flow through the intake valve seats is controlled by the heads 27 of poppet type intake valves, indicated generally by the reference numeral 28. These poppet valves 28 have stem portions 29 that are slidably supported within valve guides that are pressed or otherwise fixed in the cylinder head member 22.

Figure 3:
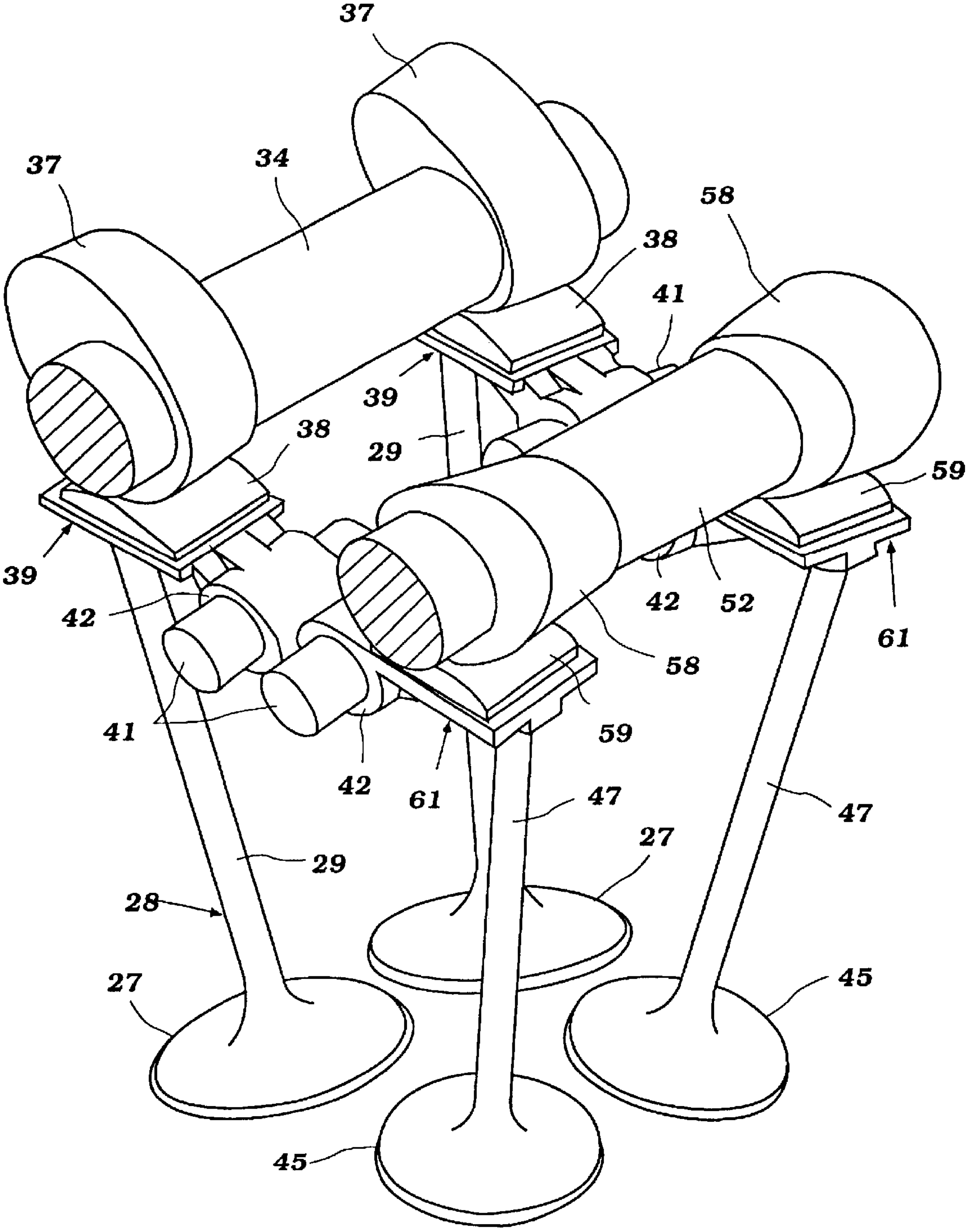
FIG. 3 is an enlarged perspective view of the cylinder head area showing only the valves and the operating mechanism therefore.
Figure 5:
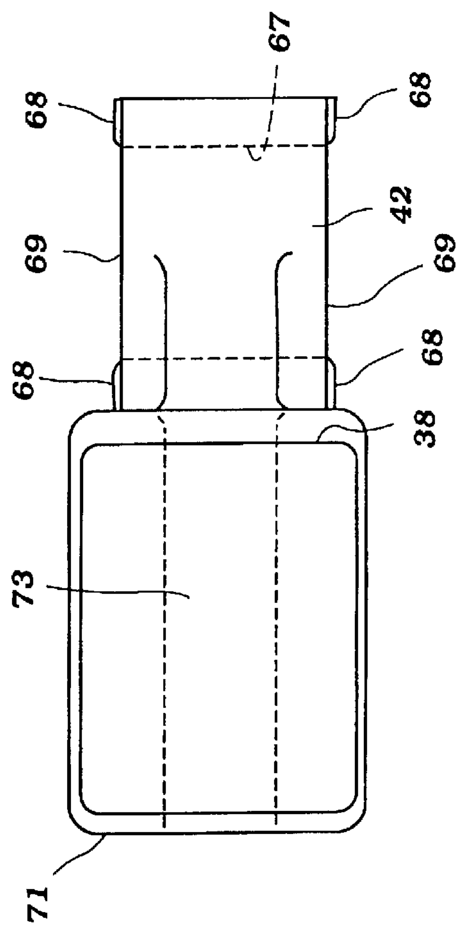
FIG. 5 is a top plan view of the rocker arm.
Figure 4:
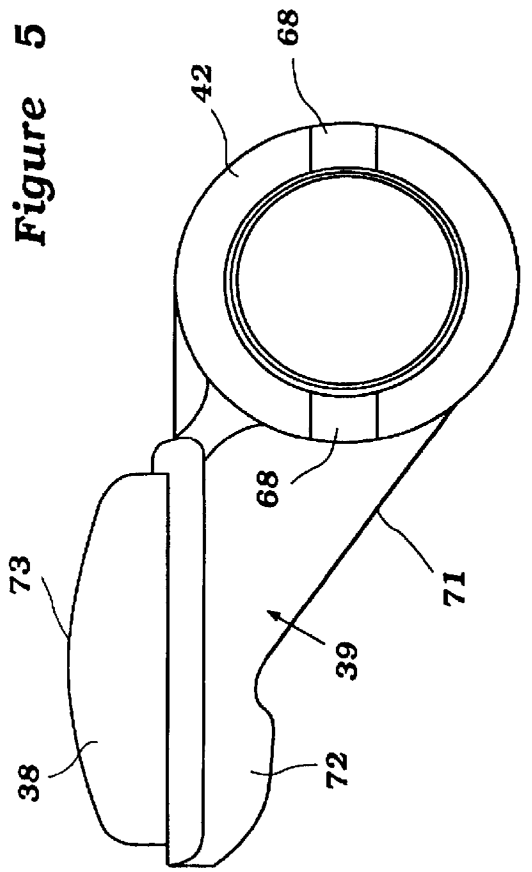
FIG. 4 is a side elevational view of one of the valve actuating rocker arms looking in a direction perpendicular to its pivotal axis.

As best seen in FIGS. 1 and 3, the reciprocal axes of the valve stems 29 are inclined at an acute angle to a longitudinally-extending plane containing the cylinder bore axis CD when viewed in the direction of FIG. 1. These valve reciprocal axes also lie at acute angles to a perpendicular plane also containing the cylinder bore axis CB and on opposite sides of this plane as best seen in FIGS. 2 and 3. Hence, the reciprocal axes of the intake valves 28 and specifically defined by their stem portions 29 are skewed to each other.

The intake valves 28 are urged to their closed positions by air spring assemblies, indicated generally by the reference numeral 29. These air spring assemblies 29 are comprised of lower cup-shaped members 31 that are fixed to the cylinder block member 22 and upper housing members 32 that are slidably supported relative thereto. The members 31 and 32 are urged apart by means of air pressure contained within the chamber defined by these components.

The upper member 32 has a keyed relationship to an upper part 33 of the valve stem 29 for holding the valves 28 in their closed position.

The intake valves 28 are opened by means of a cam and follower mechanism which is comprised of an intake camshaft 34. The intake camshaft has axially spaced bearing portions that are journaled in bearing surfaces formed in the cylinder head and bearing caps 35 affixed thereto by threaded fasteners 36.

Cam lobes 37 are formed between the bearing portions of the camshaft 34 and are engaged with follower slippers 38 of rocker arms, indicated generally by the reference numeral 39. The slipper portions 38 are interposed between the valve stem end parts 33 and the cam lobes 37.

Each rocker arm 39 is supported for pivotal movement relative to the cylinder head by a respective rocker arm shaft or pin 41. To this end, the rocker arms 39 have boss portions 42 that define bores which receive the rocker pins 41. The attachment of the rocker pins 41 to the cylinder head assembly 21 and specifically the cylinder head member 22 will be described later.

On the side of the cylinder head member 22 opposite from the intake passages 25, there are provided a pair of exhaust passages 43 each of which extends from a respective exhaust valve seat to an outlet opening formed in a surface 44 of the cylinder head member 22. The engine exhaust products are discharged from the passages 43 to an exhaust manifold (not shown) that is affixed to the cylinder head surface 44.

The exhaust valve seats are valved by the heads 45 of poppet-type exhaust valves 46. These exhaust valves 46 have stem portions 47 that are also slidably supported within the cylinder head assembly 21 by valve guides which may be pressed or otherwise formed in the cylinder head member 22. The reciprocal axes of the exhaust valves 44 lie in a common plane at an acute angle to the first plane containing the cylinder bore axis CB.

Like the intake valves 28, the reciprocal axes of the exhaust valves 46 are also disposed at opposite acute angles to a second plane that contains the cylinder bore axis CB and which is perpendicular to the first plane as best seen in FIG. 2. Hence, the axes of reciprocation of all of the valves 28 and 46 are skewed to each other.

Air spring assemblies, indicated generally by the reference numeral 48 cooperate with the exhaust valves 46 for urging the exhaust valves 46 to their closed positions. Like the intake valve air springs 29, the exhaust valve springs 48 include first members 49 that are fixed to the cylinder head member 22 in any appropriate manner. Second members 51 reciprocate in the members 49 and define with them an air volume which is charged with air under pressure.

The air spring members 51 are fixed to tip portions 52 of the valve stems 48 by keeper assemblies so that the valves 46 will be held in their closed positions.

The exhaust valves 46 are opened by means of an exhaust camshaft, indicated generally by the reference numeral 52 and which like the intake camshaft 34 is journaled in the cylinder head assembly 21. This journaling is provided by bearing surfaces formed integrally in the cylinder head member 22 and bearing caps 53 that are detachably connected thereto by threaded fasteners 54.

The intake and exhaust camshafts 34 and 52 rotate about a parallel axes that extend perpendicularly to the first mentioned plane. At one end of the cylinder head member 22, there is formed a timing case 55 in which a timing chain (not shown) is contained and which is driven by the engine crankshaft. This timing chain is associated with sprockets 56 and 57 fixed to the intake and exhaust camshaft 34 and 52, respectively so as to drive these camshafts at one-half crankshaft speed in a manner well known in this art.

The exhaust valves 46 are opened by cam lobes 58 formed on the exhaust camshaft 52 and which like the intake cam lobes 37 have a three-dimensional profile. This profile is formed in accordance with the invention in a manner which will be described later.

Slipper follower portions 59 of exhaust rocker arms 61 are engaged with the cam lobes 56 and operate the valves 46. The exhaust rocker arms 61 like the intake rocker arms 39 have boss portions 42 that are journaled on respective rocker shafts or pins 41. Each rocker shaft 41 is fixed to the cylinder head assembly 21 as previously described and this mounting arrangement will now be described by primary reference to FIG. 2.

First, however, it should be noted that the rocker arm shafts 41 are all mounted in skewed relationships to each other. The rocker arm shafts 41 are all disposed at a relatively small acute angle α (FIG. 2) to the axes of rotation of the respective camshaft 34 or 52. Also, as best seen in FIG. 1, these rocker arm shafts 41 are also inclined to the horizontal plane defined by the cylinder head lower surface 23 so that they are inclined somewhat downwardly from the cylinder bore axis CB toward the ends of the cylinder head member 22.

The cylinder head member 22 is formed with an upstanding boss 62 that has a plurality of bored openings 63 each of which receives one end of a respective rocker arm shaft 41. This boss 62 lies on one side of each of the rocker arms 39 and 61, respectively.

A pair of rocker arm support members 63 are fixed to the cylinder head member 22 outwardly of the rocker arms 39 and 61 by threaded fasteners 64. Each of these rocker arm support members 63 has a pair of further bores 65 that receive the remaining ends of the rocker arm shafts 42 so as to complete the journaling thereof in the cylinder head member 22. The threaded fasteners 64 retain the rocker arm pins 41 in the respective bores 63 and 65 of the cylinder head projection 62 and the mounting member 63, respectively. Because of this angular relationship, scuffing action between the rocker arms and the cam lobes 37 and 58 and valve stem portions 33 and 52 is avoided.

Finally, the raised central portion 62 of the cylinder head is also formed with a central spark plug well so as to receive a spark plug, shown in phantom in FIG. 1 and identified by the reference numeral 66 for firing the charge within the combustion chamber. The gap of the spark plug 66 lies generally on the cylinder bore axis CB.

The specific construction of the cam surfaces 37 and 58 and rocker followers 39 and 61 will now be described in more detail by particular reference to FIGS. 4–8 with the method of formation being described subsequently by reference to FIGS. 9–14. Since the method applied to each cam lobe 37 and 58 and each rocker follower assembly 39 and 61 is the same, only the construction associated with one of the intake cam lobes 37 and one of the rocker arm followers 39 associated therewith will be described by reference to these figures. It should be apparent to those skilled in the art that this description, applies equally as well to the construction and formation of the exhaust cam lobes 58 and the exhaust rocker arms 61.

As has been noted, the rocker arms 39 have boss portions 42 that are journaled upon the rocker pins 41. Bores 67 formed in the boss portions 42 provide this journaling. The opposite sides of the boss portions 42 are provided with outwardly projecting portions 68 that extend beyond the side surfaces 69 thereof. These extending portions 68 are slidably engaged with the cylinder head projection 62 and the rocker pin retainer 63 so as to restrict the transverse and tilting movement of the rocker arms 39 on the rocker pins 41.

Extending from the boss portion 42 is an arm-like part 71 upon which the slipper members 38 are formed. The slipper members 38 are disposed above actuating portions 72 which have a curved surface and which engage the valve tips 33 for their actuation.

As best seen in FIG. 1, the point of contact between the actuating portions 72 and the valve stems 73 lies at a distance R1 from the pivot axis of the rocker arm 39. This distance R1 is greater than the distance R2 between the line of contact between the cam lobe 37 and a slipper surface 73 which is engaged by it. Hence, there is a mechanical advantage so that there will be a greater degree of lift for the valve 28 than the height of the cam lobe 37. This permits a more compact assembly.

Figure 6:
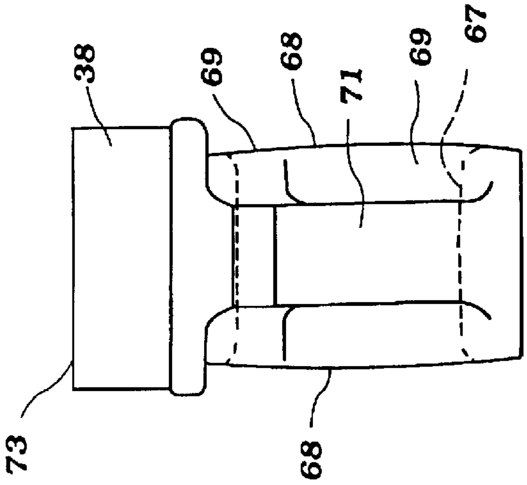
FIG. 6 is an end elevational view of the rocker arm looking at the follower end thereof.

It should be seen that the slipper surface 73 has a curved arcuate shape as seen in side view (FIG. 4) while the surface 73 is generally planar from side to side as seen from the end view of FIG. 6. The curved surface 73 of the slipper 38 is a quadratic surface that is convex on the camshaft side and which has a width that is greater than the width of the cam lobes 37.

As may be seen in FIG. 8, this curved shape coupled with the three-dimensional shape of the cam lobes 37, as will be described, provides a curved line of contact indicated by the line AB in this figure across the width of the slipper surface 73 so as to provide good lubrication and avoid point contact. The line of contact AB will shift transversely along the slipper surface 73 as the cam lobe 37 rotates and the rocker arm 39 pivots as seen in FIG. 7.

Figure 7:
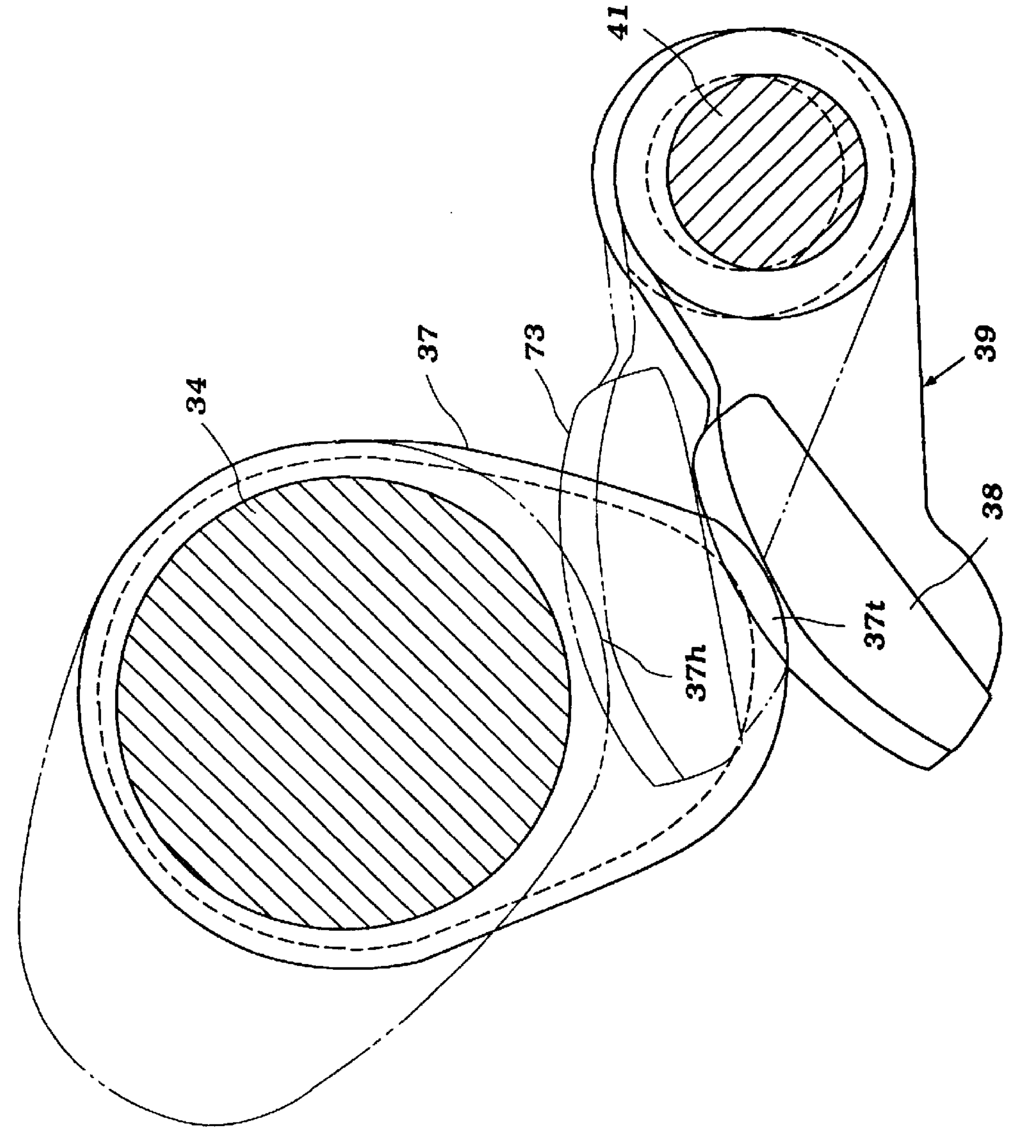
FIG. 7 is an enlarged view looking in the same general direction as FIGS. 1 and 4 showing the valve operating mechanism associated with one of the intake valves. The solid line view shows the position when the valve is fully opened and the phantom line shows the position when the valve is fully closed.
Figure 8:
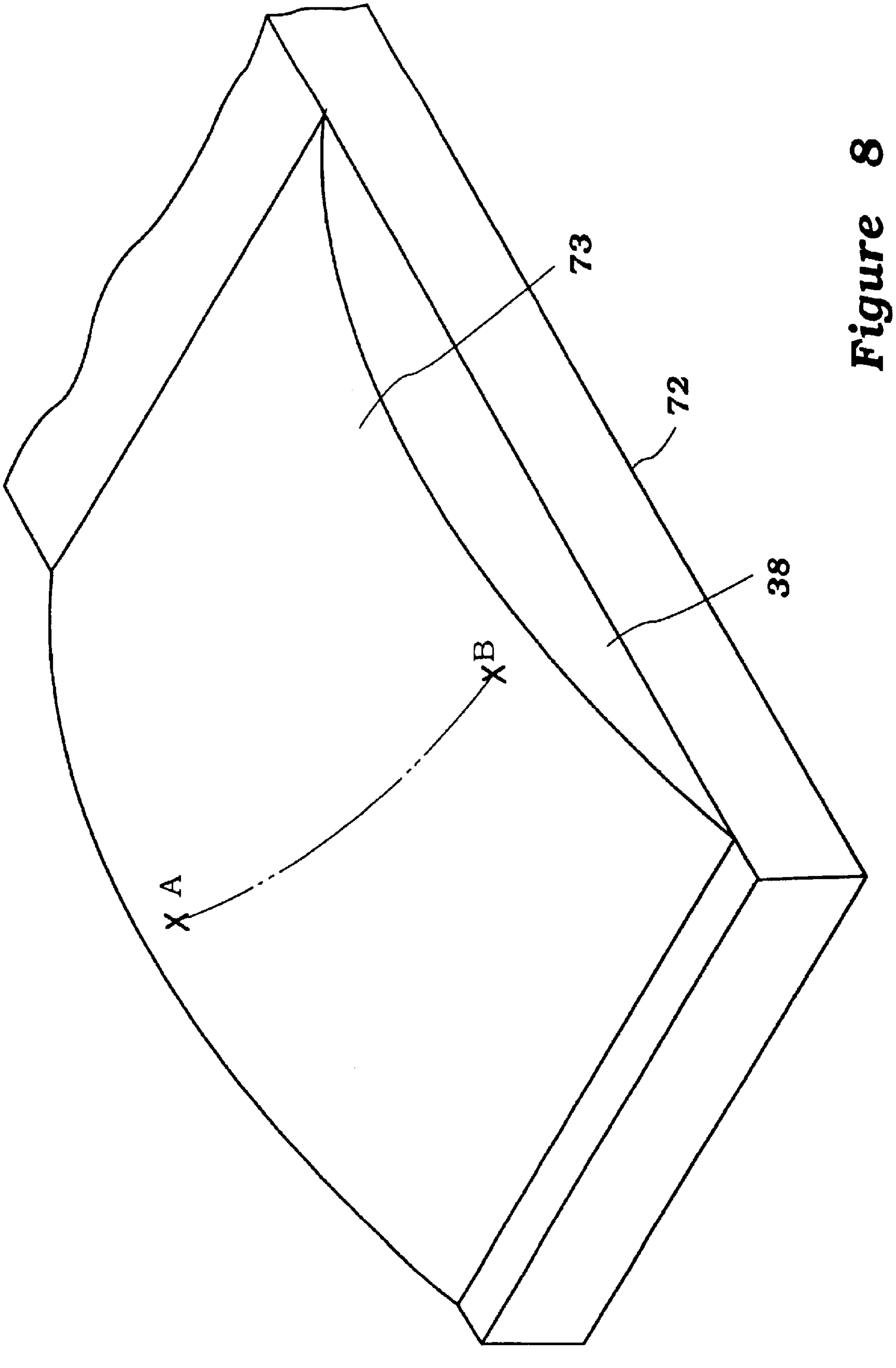
FIG. 8 is an enlarged perspective view of the follower surface of the rocker arm showing the line of contact of the cam surface with the rocker arm.

FIG. 7 shows in solid lines the condition at nearly maximum lift of the valve and in phantom lines the condition when the valve is closed and the rocker follower surface 37 is engaged with the heel portion of the cam lobe 37. As may be seen, the point of line contact AB moves away from and toward the rocker arm axis defined by the rocker pin 41 during this operation. However, at all times there is a line contact because of the configuration of the cam surface which is formed in the manner to be described shortly.

As may be seen in the FIG. 7, the cam lobe 37 has a tip portion 37*t* which provides the maximum lift of the associated valve. There is a steeply inclined ramp of the cam portion 37 that blends into the tip portion 37*t* but the tip portion 37*t* has a fairly large radius so as to minimize stress and improve wear characteristics.

Basically, the heel portion 37*h* of the cam lobe 37 is a constant radius curve but because of the three-dimensional configuration, this is a tapered curve.

Figure 9:
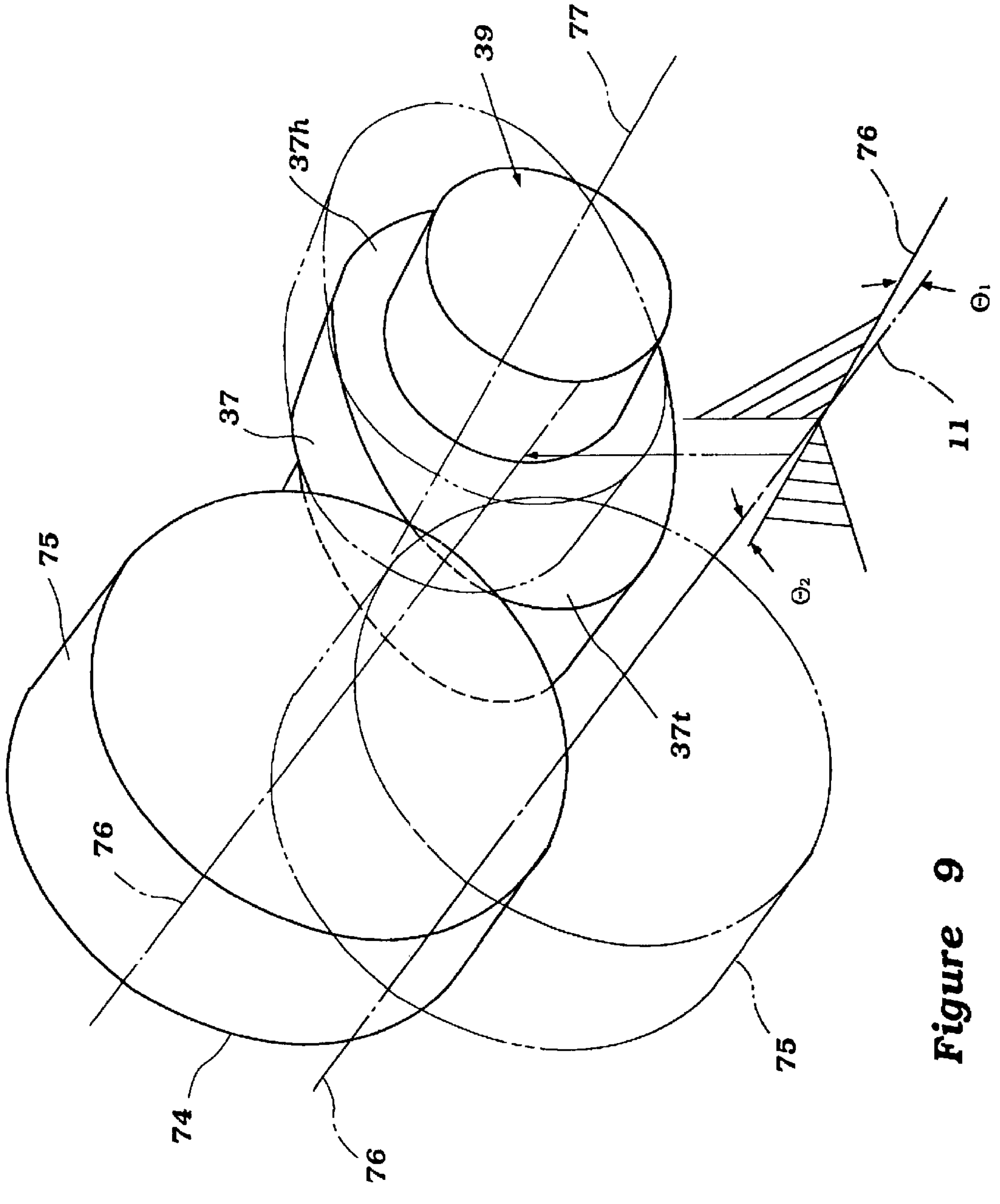
FIG. 9 is a perspective view showing the locus of the camshaft and the grinding wheel during the grinding phase by which the cam lobe is formed.

Referring now to FIG. 9, this figure shows schematically the relationship of the camshaft, the parts of which are identified by the same reference numerals as those of the finished camshaft 39 and the associated grinding wheel, indicated generally by the reference numeral 74. The grinding wheel 74 has a cylindrical outer surface 75 which basically has a radius that is generally equal to the radius of curvature of the slipper surface 73.

The grinding wheel 74 has a rotational axis 76 which is disposed at an angle to the rotational axis of the camshaft 39, which axis is indicated at 77. The axes 76 and 77 are offset from each other in both a horizontal and vertical plane. The vertical offset is at an angle θ1 which angle is equal to the corresponding angle of the rocker arm pin axis defined by the pin 41 and the rocker arm bore 67. In a like manner, the horizontal offset θ2 is also equal to that of the rocker pin axis to the axis of rotation of the camshaft 37.

During the grinding operation to form the configuration of the finished cam lobe 37, the grinding wheel 74 and the camshaft 39 are moved relative to each other so that the grinding wheel surface 75 contacts the cam surface along the same curved line as the follower surface 73 traces during the valve actuation. To achieve this, the camshaft 39 is rotated about its axis 77 at a relatively slow speed. During this rotation, the axis of the grinding wheel 76 is moved relative to the surface of the camshaft due to the rotation of the camshaft about its axis 77.

Figure 10:
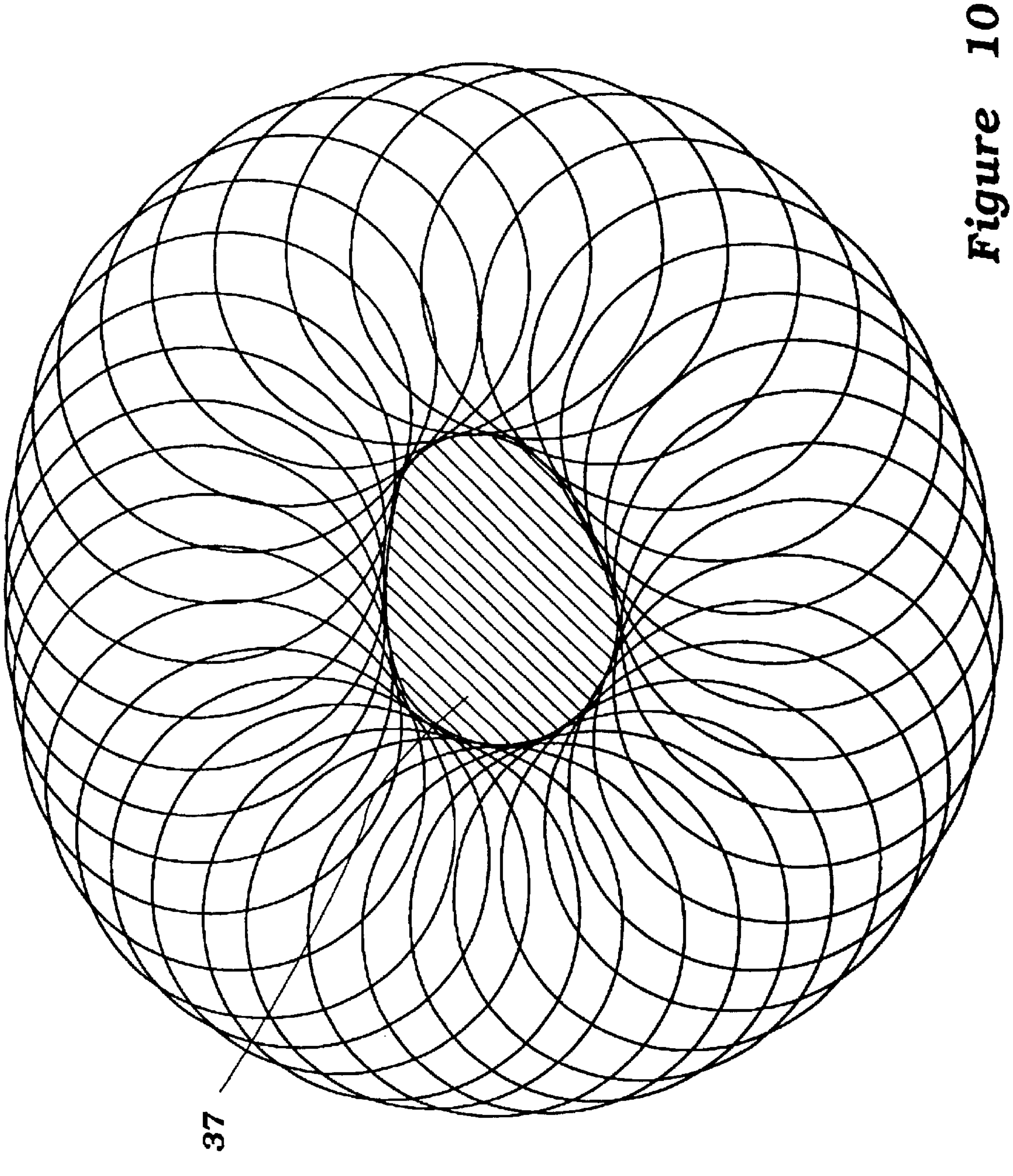
FIG. 10 is a view showing the locus of movement of the grinding wheel relative to the cam lobe during the grinding operation.

Thus, during a single revolution, the grinding wheel effectively moves around the cam surface 37 as seen in the various locus illustrated in FIG. 10. During this same operation, the grinding wheel axis 76 is moved translationally relative to the camshaft surface 77 to form the desired profile for the cam 37. During the grinding operation, the axis 76 of the grinding wheel 75 is moved in a parallel direction toward and away from the camshaft axis 77. This translational movement is done while maintaining the angles θ1 and θ2 between the axes 77 and 76.

During the grinding of the heel portion of the cam 37, the translational motion of the grinding wheel 75 relative to the camshaft 39 is only in the direction transverse to the rotational motion. However, as the grinding approaches the tip or nose portion 37*t* of the cam lobe, the grinding wheel is also translated in a direction parallel to its axis. This motion is done so as to provide a very slight concavity in the surface of the lobe as may be seen partially in FIG. 12. That is, in the rounded portion of the cam lobe tip 37*t*, there is a slight concavity from side to side in addition to the curvature looking from the end. This ensures that there will be a complete line contact between the cam lobe 37 and the follower surface 73.

Figure 13:
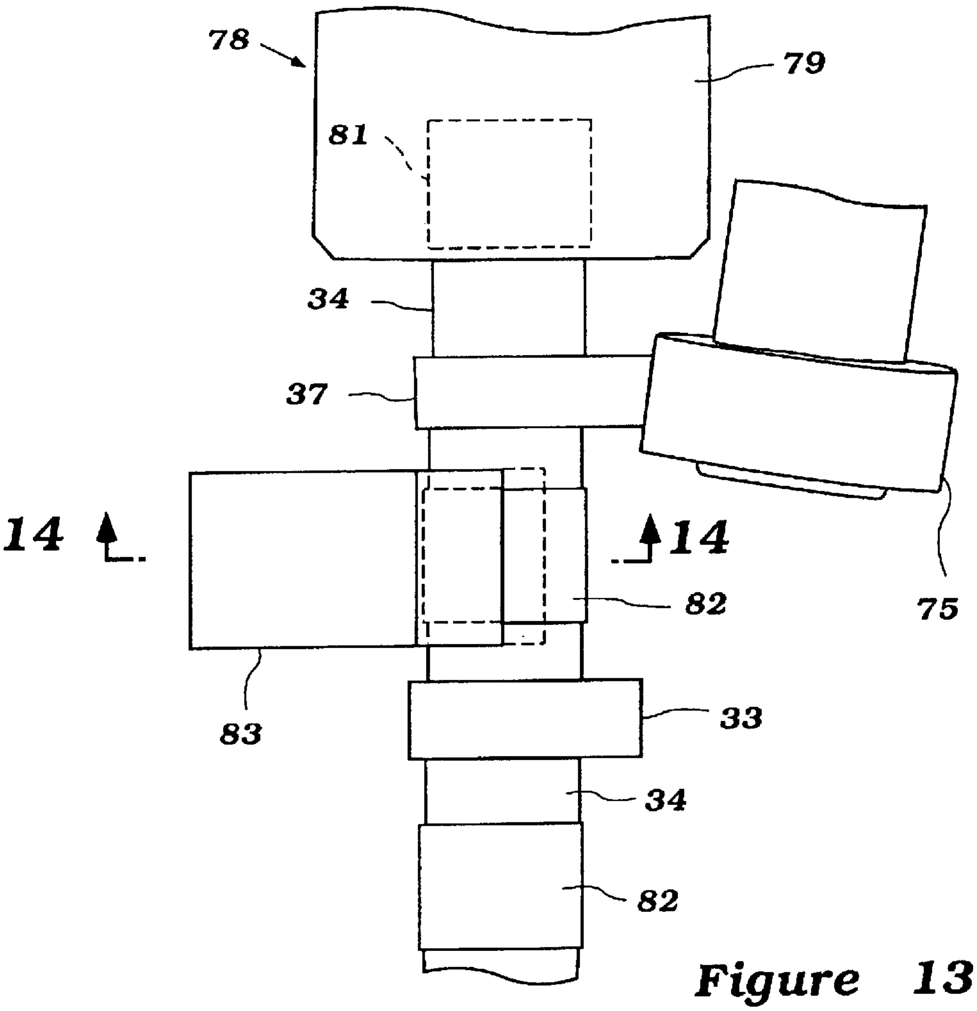
FIG. 13 is a top plan view showing the grinding apparatus and particularly the support and backup for the camshaft.
Figure 14:
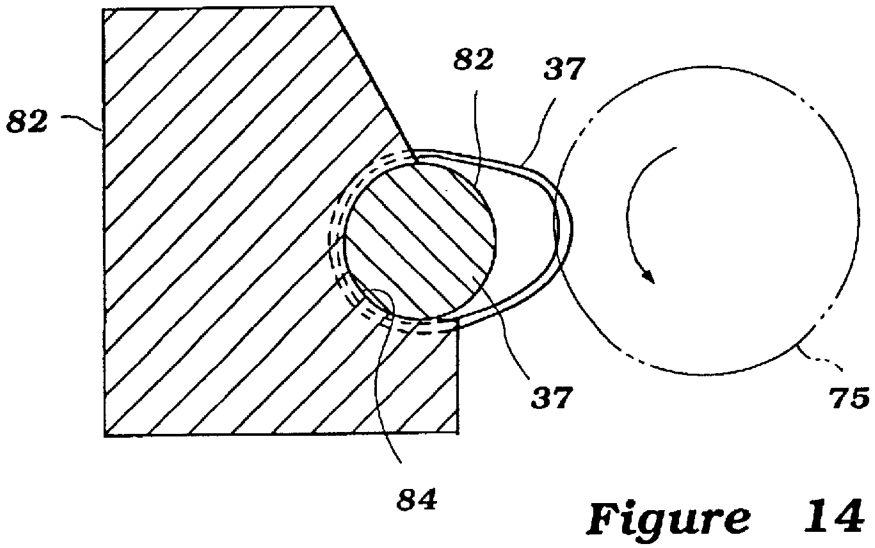
FIG. 14 is a cross-sectional view of this apparatus taken along the line 14—14 of FIG. 13.

The actual grinding apparatus is shown partially schematically in FIGS. 13 and 14. This includes a head stock 78 that has a chuck portion 79 that receives an end bearing 81 of the blank from which the camshaft 34 is formed. The camshaft 34 also has bearing surfaces 82 that are formed between the various cam lobes 37 formed thereon.

A backup member 83 is provided on the grinding apparatus between the head stock 78 and the grinding wheel 75 and the cam lobe 37 being machined. This backup member has an arcuate recess 84 that is complementary to the bearing surface 82 and engages more than one-half of its circumferential extent. As a result, the grinding operation will not cause any deflection of the camshaft 34 that could interfere with the formation of the desired surface for the cam lobe 37.

Figure 11:
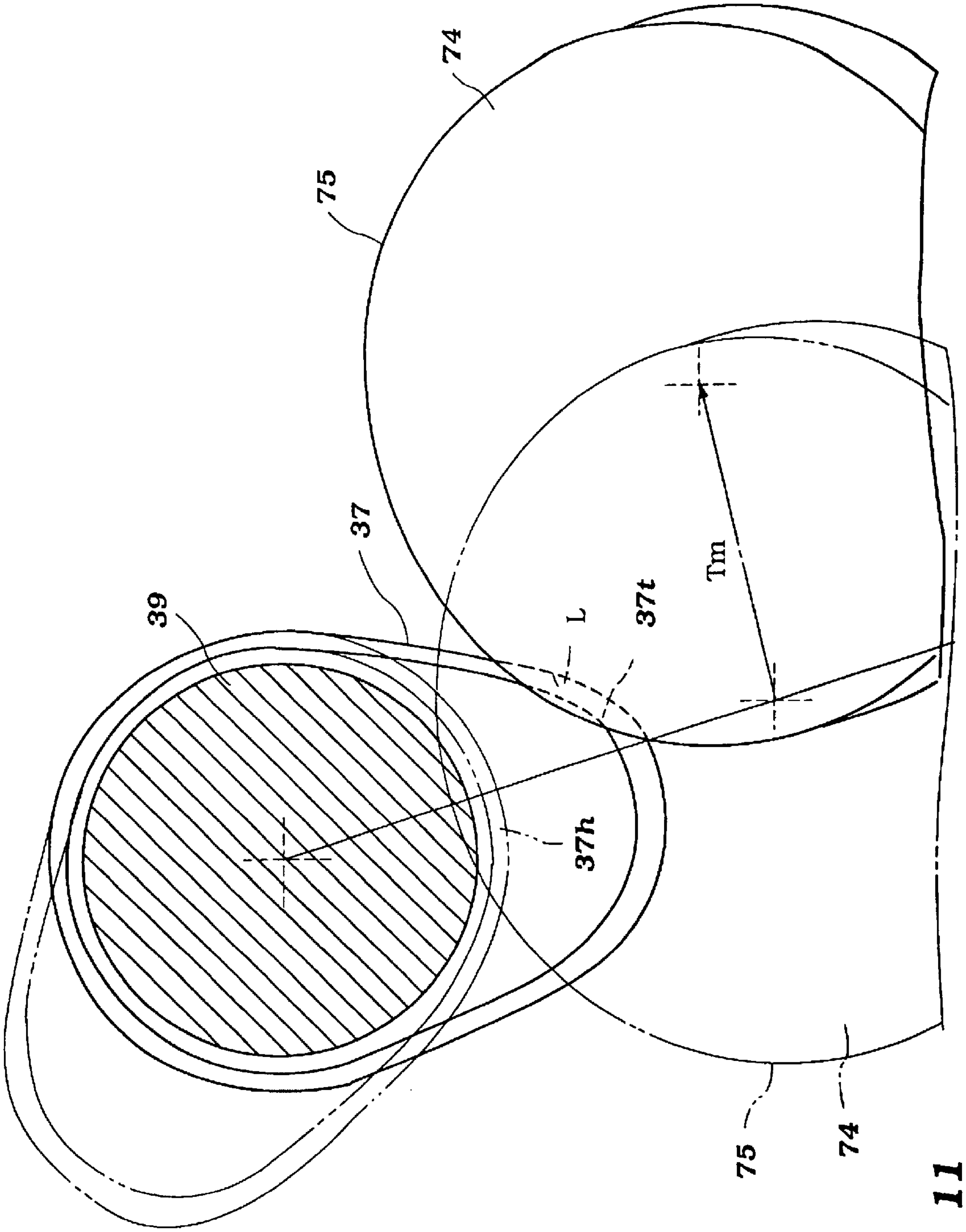
FIG. 11 is a view also showing the grinding operation and shows the position of the grinding wheel and the camshaft when the lobe portion is being ground in solid lines and when the heel portion is being ground in phantom lines.
Figure 12:
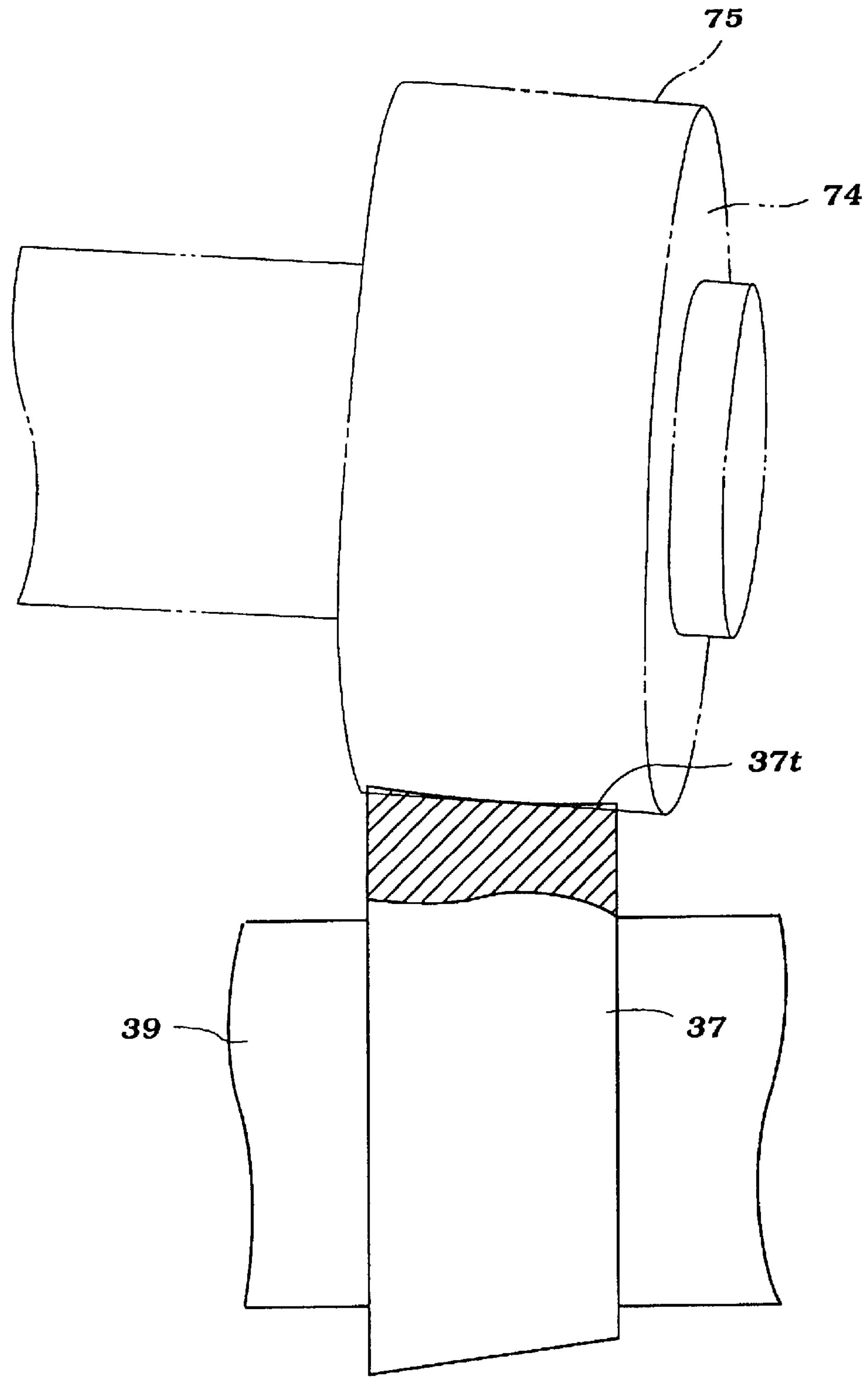
FIG. 12 is an enlarged view taken perpendicularly to the axis of the camshaft and shows the grinding operation that forms the concavity of the lobe portion of the camshaft.

FIG. 11 shows the relationship of the grinding wheel 75 to the camshaft 34 and illustrates the translational motion which occurs when creating the grinding of the wheel portion 37*h* and the tip portion 37*t*. The translational motion is indicated by the line Tm. As has been noted, in addition to this motion when the tip portion is being ground the wheel 75 is also moved axially along its axis so as to provide an area L where the cam lobe will be ground in a somewhat concave curvature. Because of this, the three-dimensional contact is maintained with the follower along a line so that point contact which could destroy the lubricant layer during engine operation is avoided. This is particularly desirable at the smallest radius portion of the cam tip 37*t*, where the wear problem could be the greatest.

Figure 15:
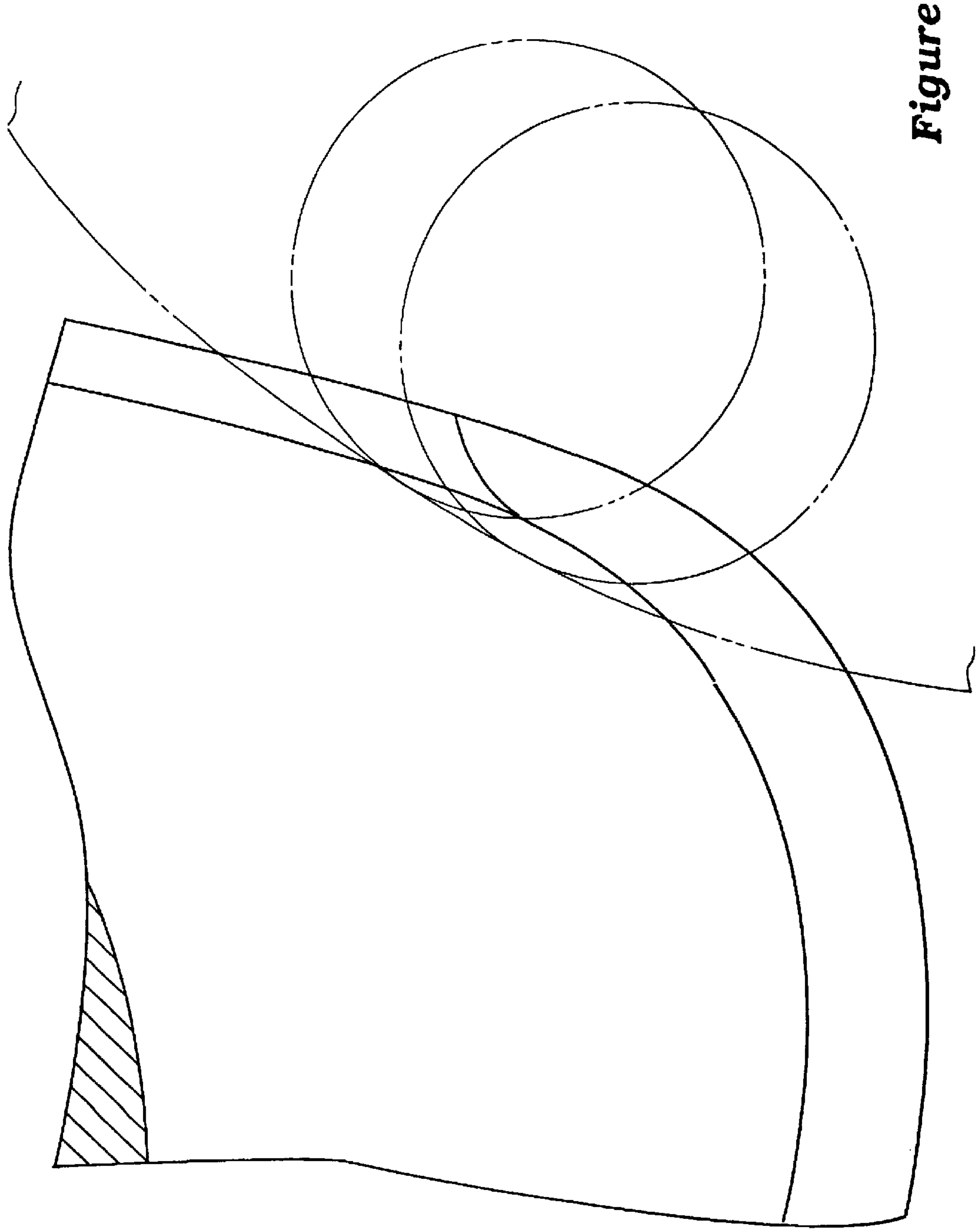
FIG. 15 is a further enlarged view, in part similar to FIG. 11, and shows the operation in grinding the lobe in accordance with another embodiment of the invention.

In the embodiment as thus far described, the grinding wheel 75 had a radius that was substantially the same as the radius of the follower surface 73. FIG. 15 shows another embodiment wherein the grinding wheel, indicated here at 101 has a substantially smaller radius. In fact, this radius may be approximately one-half or less than that previously shown. Nevertheless, the same grinding technique is employed. That is, the axis of the grinding wheel 101 is translated relative to the camshaft axis while the camshaft is rotated slowly about its axis during the grinding of the heel portion and some of the lift portion. However, as the tip portion 37*t* is ground, the grinding wheel is also moved in an axial direction along its axis so as to provide the relatively shallow curvature that provides the continued line contact between the cam lobe 37 and the follower surface 73.

Thus, from the foregoing description it should be readily apparent that the described cam and follower arrangement and method for manufacturing it is effective in providing a three-dimensional cam surface that can operate the valve mechanism without using multiple rocker arms while at the same time avoiding stuffing action between the rocker arm and the valve tip and permitting the forces on the valve to be transmitted directly along their reciprocal axes so as to eliminate bending stresses. All of this is done while maintaining the line contact between the three-dimensional cam and the rocker which pivots about an axis that is inclined relative to the axis of rotation of the camshaft.

Of course, the foregoing description is that of a preferred embodiment of the invention and various changes and modifications may be made without departing from the spirit and scope of the invention, as defined by the appended claims.

What is claimed is:

1. A method for forming a three dimensional cam lobe of a camshaft for operating a rocker arm follower pivotal about an axis that is skewed to the rotational axis of said camshaft, said method comprising the steps of mounting of a camshaft blank having a blank cam lobe for rotation about an axis that is coincident to said rotational axis of the camshaft, rotationally driving a grinding wheel having a curved grinding surface about an axis that is skewed to the axis of rotation about which the mounted camshaft rotates, rotating said camshaft slowly about said camshaft axis while the grinding wheel is rotated about its axis, translating said axes around each other so that said grinding wheel circumscribes said camshaft axis so as to form the desired cam lobe configuration, and moving said grinding wheel axis relative to said camshaft axis so that said grinding wheel will contact the cam lobe surface along a line that conforms to the line of contact of said cam lobe with the rocker arm follower when mounted in an engine.

2. A method for forming a three dimensional cam lobe of a camshaft as set forth in claim 1, wherein the translation of the grinding wheel and camshaft axes is in a direction perpendicular to one of said axes during the grinding operation.

3. A method for forming a three dimensional cam lobe of a camshaft as set forth in claim 1, wherein the translation of the grinding wheel and camshaft axes is in a direction along one of said axes during the grinding operation of at least a portion of the cam lobe surface.

4. A method for forming a three dimensional cam lobe of a camshaft as set forth in claim 2, wherein the translation of the grinding wheel and camshaft axes is in a direction along one of said axes during the grinding operation of the tip portion of the cam lobe surface.

5. A method for forming a three dimensional cam lobe of a camshaft as set forth in claim 4, wherein the translation of the grinding wheel and camshaft axes is in a direction perpendicular to one of said axes during the grinding operation.

* * * * *